United States Patent [19]
Wilson et al.

[11] Patent Number: 5,595,410
[45] Date of Patent: Jan. 21, 1997

[54] QUICK-RELEASE LOCKING DEVICE FOR TELESCOPING MEMBER

[75] Inventors: Duard W. Wilson, Anderson, Calif.; Jon L. Gerber, Woodland, Ill.; Jeff G. Christianson, Oshkosh, Wis.

[73] Assignee: Chicago Steel Tape Co., Watseka, Ill.

[21] Appl. No.: 394,574

[22] Filed: Feb. 27, 1995

[51] Int. Cl.⁶ .................................................. E05C 17/02
[52] U.S. Cl. ........................................ 292/306; 292/259 R
[58] Field of Search .................................. 292/306, 305, 292/259 R, 292

[56] References Cited

U.S. PATENT DOCUMENTS

| | | | |
|---|---|---|---|
| 546,379 | 9/1895 | Colton | 292/306 |
| 758,685 | 5/1904 | Phelps | 292/306 |
| 780,458 | 1/1905 | Townsend | 292/306 |
| 782,412 | 2/1905 | Neudorff | 292/306 |
| 2,090,550 | 8/1937 | Pilblad | 292/306 X |
| 3,603,623 | 9/1971 | Widman et al. . | |
| 3,682,506 | 8/1972 | Bruyere et al. . | |
| 4,039,213 | 8/1977 | Walters . | |
| 4,284,298 | 8/1981 | Kaufmann . | |
| 4,429,902 | 2/1984 | Cowan . | |
| 4,662,771 | 5/1987 | Roe et al. . | |
| 5,011,104 | 4/1991 | Fang . | |
| 5,048,150 | 9/1991 | Guerin | 292/306 X |
| 5,238,213 | 8/1993 | Pool | 292/306 X |
| 5,316,041 | 5/1994 | Ramacier et al. . | |

FOREIGN PATENT DOCUMENTS

| | | | |
|---|---|---|---|
| 2318796 | 10/1973 | Germany | 292/306 |

OTHER PUBLICATIONS

"New" Quick–Release Prism Poles Catalog Sheet, Chicago Steel Tape.

*Primary Examiner*—Rodney M. Lindsey
*Assistant Examiner*—Monica E. Millner
*Attorney, Agent, or Firm*—Lee, Mann, Smith, McWilliams, Sweeney & Ohlson

[57] ABSTRACT

A locking device for a prism pole having a first telescoping member slidably located within a second telescoping member to selectively lock and unlock the first telescoping member relative to the second telescoping member. The locking device includes a housing having a sidewall with a bore extending therethrough. The upper end of the outer telescoping member is attached to the housing and the inner telescoping member is slidably located within the bore of the housing. First and second locking mechanisms, each comprising an annular ring, are disposed within the housing. Each ring includes a bore through which the inner telescoping member extends. The first locking mechanism is selectively pivotal between a first position, wherein the annular ring engages the inner telescoping member to prevent sliding movement in a first direction while allowing sliding movement in a second and opposite direction, and a second position wherein the first locking mechanism allows sliding movement in either direction. The second locking mechanism is pivotal between a first position, wherein sliding movement of the inner telescoping member is prevented in the second longitudinal direction while allowing sliding movement in the first direction, and a second position wherein the second locking mechanism permits sliding movement of the inner telescoping member in either direction.

19 Claims, 2 Drawing Sheets

QUICK-RELEASE LOCKING DEVICE FOR TELESCOPING MEMBER

BACKGROUND OF THE INVENTION

The present invention is directed to a quick-release locking device for selectively locking and unlocking a first telescoping member to a second telescoping member, and in particular to a locking device which prevents movement of the first telescoping member in both a first longitudinal direction and a second and opposite longitudinal direction with respect to the second telescoping member while selectively permitting longitudinal movement of the first telescoping member in either the first or second longitudinal direction.

Prism poles are used in surveying to support surveying equipment such as a prism at a desired height above ground level while facing in a desired direction. Prism poles typically include a plurality of telescoping poles or tubes located concentrically one within the other to provide for selective height adjustment. The outermost tube includes a lower end which engages the ground and the innermost tube includes an upper end having a mounting mechanism for attaching a piece of surveying equipment such as a prism thereto. The inner tube is slidable along its central longitudinal axis in a first longitudinal direction or in a second and opposite longitudinal direction such that the distance between the lower end of the prism pole and the upper end of the prism pole may be varied as required. While a prism pole is preferably selectively adjustable in length, the telescoping members of the prism pole preferably should be capable of being selectively locked to one another such that the upper end of the prism pole will not move relative to the lower end of the prism pole once a height for the prism is selected. A locking device is therefore required to selectively lock an inner telescoping member to an outer telescoping member while selectively allowing sliding longitudinal movement therebetween. In addition to providing selective locking and unlocking of an inner telescoping member to an outer telescoping member, the locking device should also include a quick-release feature to allow the quick and easy adjustment of the overall length of the prism pole. The locking device of the present invention provides these features.

SUMMARY OF THE INVENTION

A locking device for selectively locking and unlocking a first telescoping member of a prism pole to a second telescoping member of the prism pole to selectively prevent and allow relative sliding longitudinal movement therebetween. The first telescoping member is selectively slidable in a first longitudinal direction with respect to the second telescoping member and is selectively slidable in a second and opposite longitudinal direction with respect to the second telescoping member. The locking device includes a housing including a sidewall having a first end and a second end. A bore extends through the housing between the first end and the second end of the sidewall. The housing is connectable to an upper end of the second telescoping member such that the first telescoping member extends through the bore in the sidewall and is slidable therein. A first locking mechanism is disposed within the housing. The first locking mechanism includes a first end having a first engagement portion adapted to engage and grip the first telescoping member and a second end having a second engagement portion adapted to engage and grip the first telescoping member. The first and second engagement portions of the first locking mechanism are located on substantially diametrically opposite sides of the first telescoping member. The first locking mechanism is pivotally secured at its first end to the housing and is pivotal between a first position and a second position. A first biasing member such as a spring biases the first locking mechanism from the second position towards the first position. When the first locking mechanism is in the first position, the first and second engagement portions of the first locking mechanism engage and grip the first telescoping member and prevent movement of the first telescoping member in the first direction with respect to the second telescoping member, while allowing sliding movement in the second direction. When the first locking mechanism is pivoted to the second position, the first and second engagement portions release their grip on the first telescoping member such that the first locking mechanism will permit sliding movement of the first telescoping member in either the first or the second longitudinal direction with respect to the second telescoping member.

A second locking mechanism is also disposed within the housing. The second locking mechanism includes a first end having a third engagement portion adapted to engage the first telescoping member and a second end having a fourth engagement portion also adapted to engage the first telescoping member. The third and fourth engagement portions are located on substantially diametrically opposite sides of the first telescoping member. The second locking mechanism is pivotally secured at its first end to the housing and is pivotal between a first position and a second position. A second biasing member such as a spring biases the second locking mechanism from the second position towards the first position. When in the first position, the third and fourth engagement portions of the second locking mechanism engage and grip the first telescoping member and prevent sliding movement of the first telescoping member in the second longitudinal direction with respect to the second telescoping member, while allowing sliding movement in the first direction. When the second locking mechanism is pivoted to the second position, the third and fourth engagement portions release their grip on the first telescoping member such that the second locking mechanism will allow sliding movement of the first telescoping member in either the first or second longitudinal direction with respect to the second telescoping member. The first and second locking mechanisms each respectively comprise at least one annular locking ring pivotally associated with the housing. Each ring includes a generally circular inner rim forming an aperture through which the inner telescoping member extends.

DESCRIPTION OF THE PREFERRED EMBODIMENT

Figure 1:
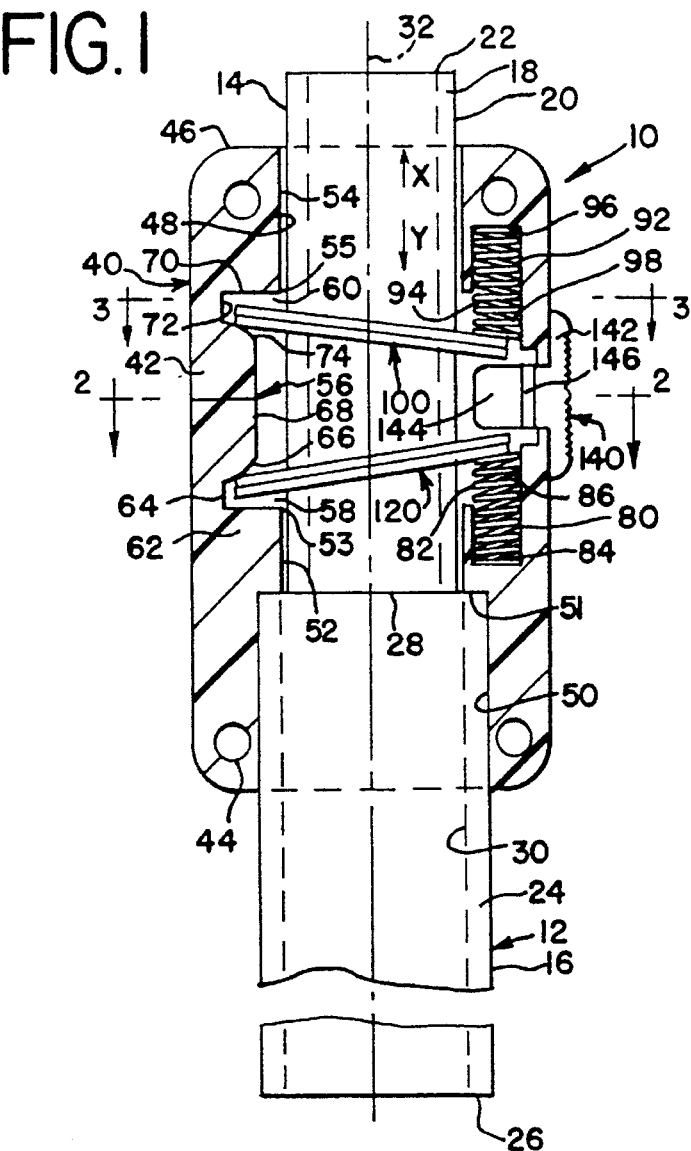
FIG. 1 shows the locking device of the present invention attached to a prism pole with a portion of the housing of the locking device removed and shown in cross section.
Figure 2:
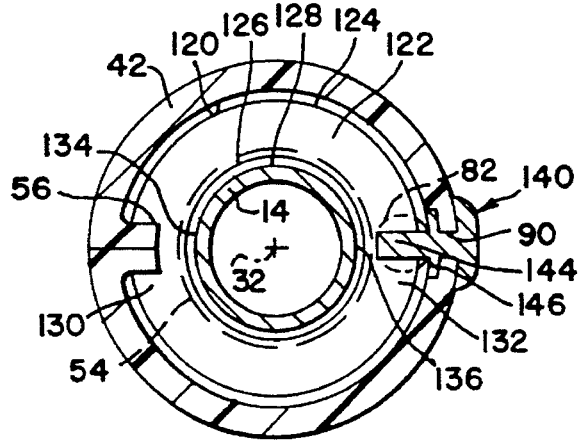
FIG. 2 is a cross sectional view of the locking device taken along lines 2—2 of FIG. 1.
Figure 3:
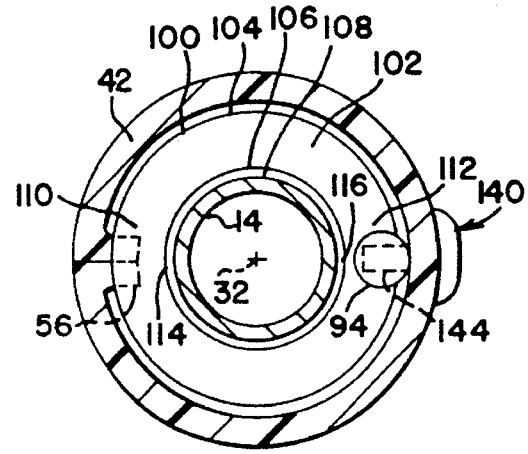
FIG. 3 is a cross sectional view of the locking device taken along lines 3—3 of FIG. 1.

The locking device 10 is shown in FIG. 1 attached to a prism pole 12. The prism pole 12 includes an inner telescoping member 14 and an outer telescoping member 16. The inner telescoping member 14 includes a generally circular wall 18 having an outer surface 20. The wall 18 of the inner telescoping member 14 extends longitudinally from a bottom end (not shown), which is disposed within the outer telescoping member 16, to a top end 22 which is located outside of the outer telescoping member 16. The outer telescoping member 16 includes a generally circular wall 24 which extends longitudinally between a bottom end 26 and a top end 28. The outer telescoping member 16 includes a generally circular bore 30 which extends from the bottom end 26 of the wall member 24 to the top end 28. The inner telescoping member 14 is concentrically disposed within the bore 30 of the outer telescoping member 16. The inner telescoping member 14 and the outer telescoping member 16 include a common central longitudinal axis 32 extending between the bottom end and the top end of each telescoping member 14 and 16. The inner telescoping member 14 is slidable within the outer telescoping member 16 in a first linear longitudinal direction as indicated by the arrow X in FIG. 1, wherein the top end 22 of the inner telescoping member 14 moves away from the top end 28 of the outer telescoping member 16 to lengthen the prism pole 12, and a second and opposite linear longitudinal direction as indicated by the arrow Y in FIG. 1, wherein the top end 22 of the inner telescoping member 14 moves toward the top end 28 of the outer telescoping member 16 to thereby shorten the length of the prism pole 12. The inner telescoping member 14 may also be rotatable about the longitudinal axis 32 with respect to the outer telescoping member 16.

The telescoping members 14 and 16 each preferably comprise an elongate hollow pole or tube having a circular cross section. The members can be made of plastic, fiberglass, steel, or aluminum. The outer telescoping member 16 preferably includes an outer diameter of 1¼ inches and the inner telescoping member 14 preferably includes an outer diameter of 1 inch. One or more additional telescoping members (not shown) may be slidably disposed within a bore of the inner telescoping member 14, and the outer telescoping member 16 may be disposed within the bore of another telescoping member (not shown). The top end 22 of the inner telescoping member 14 preferably includes a mounting device (not shown) for attaching a surveying tool such as a prism (not shown) thereto.

The locking device 10 includes a housing 40 having a generally cylindrical sidewall 42 extending from a bottom end 44 to a top end 46. A bore 48 extends through the housing 40 from the bottom end 44 to the top end 46 of the sidewall 42. The bore 48 forms a lower generally cylindrical wall surface 50 extending from the bottom end 44 of the housing 40 to a generally annular wall surface 51 which is generally perpendicular to the lower wall surface 50. The bore 48 also forms an intermediate generally cylindrical wall surface 52 which extends from the annular wall surface 51 to a circular edge 53, and an upper generally cylindrical wall 54 portion which extends downwardly from the top end 46 of the housing 40 to a lower circular edge 55. The diameter of the lower cylindrical wall surface 50 is larger than the diameters of the intermediate and upper cylindrical wall surfaces 52 and 54. The lower cylindrical wall surface 50 is adapted to receive the top end 28 of the outer telescoping member 14 in a close fit, with the top end 48 of the outer telescoping member 16 abutting the annular wall surface 51. The housing 40 may be attached to the top end 28 of the outer telescoping member 16 by an adhesive, by a friction fit between wall 24 of the outer telescoping member 16 and the lower cylindrical wall surface 50, by a threaded connection between the top end 28 and the lower cylindrical wall surface 50, or various other fastening mechanisms. The diameters of the intermediate and upper cylindrical wall surfaces 52 and 54 are preferably the same and are sufficiently large to receive the inner telescoping member 14 therein and to allow sliding longitudinal movement of the inner telescoping member 14.

The housing 40 includes a rib 56 formed in the sidewall 42 which extends generally vertically between the intermediate and upper wall surfaces 52 and 54. The rib 56 forms a lower chamber 58 and a spaced apart upper chamber 60. The lower chamber 58 includes a lower generally horizontal wall portion 62 which extends outwardly from the upper circular edge 53 of the intermediate wall surface 52, a generally vertical wall portion 64 which extends upwardly from the lower wall portion 62, and a sloped wall portion 66 located on the rib 56 which extends upwardly and inwardly from the vertical wall portion 64 to a generally vertical wall portion 68 located on the rib 56. The upper chamber 60 includes an upper generally horizontal wall portion 70 which extends outwardly from the lower circular edge 55 of the upper wall portion 54, a generally vertical wall portion 72 which extends downwardly from the upper wall portion 70, and a sloped wall portion 74 located on the upper end of the rib 56 which extends downwardly and inwardly from the vertical wall portion 72 to the vertical wall portion 68. The sloped wall portion 66 of the rib 56 is spaced apart from and located opposite the lower wall portion 62. The sloped wall portion 74 of the rib 56 is spaced apart from and located opposite the upper wall portion 70.

The housing 40 also includes a lower chamber 80 located in the sidewall 42 of the housing 40 diametrically across the bore 48 from the lower chamber 58. The lower chamber 80 is adapted to receive a resilient biasing member 82 such as a spring. The biasing member 82 includes a lower end 84 which engages the housing 40 and an upper end 86. A slot 90 is formed in the housing 40 which extends through the sidewall 42 between the bore 48 and the exterior surface of the housing 40. The slot 90 is located above the lower chamber 80. An upper chamber 92 is located in the sidewall 42 above the slot 90 and chamber 80, and diametrically across the bore 48 from the upper chamber 60. The upper chamber 92 is adapted to receive a resilient biasing member 94. The biasing member 94 includes a lower end 96 in engagement with the housing 40 and an upper end 98. The housing 40 may be formed in two halves which are adapted to be fastened together around the telescoping members 14 and 16.

A first locking mechanism 100 is disposed within the housing 40. The first locking mechanism 100 comprises a plurality of annular locking rings 102 stacked one on top of the other which are laterally movable with respect to each other. Alternatively, the locking mechanism 100 may comprise a single annular locking ring. Each annular locking ring 102 is generally planar and includes a generally circular outer rim 104 and a concentrically located generally circular inner rim 106 formed by an aperture 108 extending through the annular ring 102. A first end or edge 110 of each locking ring 102 is located in the upper chamber 60 with a portion of the outer rim 104 of each annular locking ring 102 located between the upper wall portion 70 and the sloped wall portion 74. The chamber 80 thereby pivotally mounts or secures the first end of the rings 102 to the housing 40. A second end or edge 112 of each locking ring 102, which is located diametrically across the aperture 108 from the first end 110, is associated with and engages the upper end 98 of the biasing member 94. The first ends 110 of the locking rings 102 are pivotally retained within the upper chamber 60 such that the locking rings 102 of the locking mechanism 100 may pivot between a first position and a second position. The biasing member 94 biases the locking rings 102 of the first locking mechanism 100 from the second position towards the first position to thereby pivot about the wall 74 in a clockwise direction.

When the locking rings 102 of the first locking mechanism 100 are located in the first position as shown in FIG. 1, the rings 102 are disposed at an acute angle to the axis 32 and slope downwardly from the first end 110 to the second end 112. When the locking rings 102 of the first locking mechanism 100 are in the first position a first rim portion 114 of the inner rim 106 engages the outer surface 20 of the inner telescoping member 14 and a second rim portion 116 of the inner rim 106, which is located diametrically across the aperture 108 from the first rim portion 114, engages the outer surface 20 of the inner telescoping member 114 diametrically opposite from where the first rim portion 114 engages the outer surface 20. The rim potions 114 and 116 of the locking rings 102 thereby grip the inner telescoping member 14 and prevent sliding movement of the inner telescoping member 114 in the downward direction Y. The first locking mechanism 100, however, when located in the first position, permits sliding movement of the inner telescoping member in the upward longitudinal direction X as movement in the upward direction X will slightly compress the biasing member 94, thereby allowing the second ends 112 of the locking rings 102 to pivot slightly upwardly towards a horizontal position to intermittently release the grip of the rim portions 114 and 116 from the inner telescoping member 14.

A second locking mechanism 120 is disposed within the housing 40 below the first locking mechanism 100. The second locking mechanism 120 includes one or more annular locking rings 122, each having a generally circular outer rim 124 and a concentric generally circular inner rim 126 formed by an aperture 128 extending through the annular locking ring 122. The inner telescoping member 14 extends through the apertures 128. Each locking ring 122 includes a first end or edge 130 which is located within the lower chamber 58 of the housing 40 and a second end or edge 132 which is associated with and engages the upper end 86 of the biasing member 82. The first end 130 of the annular ring 122 is located diametrically across the aperture 128 from the second end 132. The inner rim 126 of each annular ring 122 includes a first rim portion 134 and a second rim portion 136 located diametrically across the aperture 128 from the first rim portion 134. The locking rings 122 of the second locking mechanism 120 have their first ends 130 located within the chamber 58 such that the first ends 130 are thereby pivotally mounted or secured to the housing 40. The locking rings 122 are pivotal about their first ends 120 between a first position and a second position. When in the first position as shown in FIG. 1, the locking rings 122 are located at an acute angle to the axis 32 such that the locking rings 122 slope upwardly from the first end 130 to the second end 132. The locking rings 102 and 122 thereby slope towards one another. When in the first position, the first rim portion 134 and the second rim portion 136 of the locking rings 122 engage and grip opposite sides of the outer surface 20 of the inner telescoping member 14 to prevent linear sliding movement of the inner telescoping member in the upward longitudinal direction X out of the outer telescoping member 16. However, the second locking mechanism 120, when in the first position, allows the inner telescoping member 14 to slide in the downward longitudinal direction Y into the outer telescoping member 16, as downward movement of the inner telescoping member 14 in the longitudinal direction Y will slightly compress the biasing member 82 and pivot the locking rings 122 towards the horizontal such that the rim portions 134 and 136 will intermittently release their grip from the outer surface 20 of the inner telescoping member 14.

The apertures 108 and 128 in the locking rings 102 and 122 are preferably circular, but may also be formed in various other shapes such as oval, triangular, square or rectangular. In addition, while the locking mechanisms 100 and 120 each preferably comprise a generally annular locking ring 102 or 122, the locking mechanisms 100 and 120 may alternately each comprise a generally C-shaped or V-shaped member having an aperture located between two spaced apart leg portions.

An actuator member 140 is slidably located in the slot 90 of the housing 40. The actuator member 140 includes a button 142 which is located on the outside of the housing 40 and a tab 144 which extends inwardly from the button 142 through the slot 90. The tab 144 includes two outwardly extending wing members 146, one of which extends outwardly from each side of the tab 144. The sidewall 42 of the housing 40 extends between the wing members 146 and the button 142 to slidably retain the actuator member 140 to the housing 40. The actuator member 140 is moveable in the longitudinal direction X from a central position to an upper position, and is moveable the longitudinal direction Y from the central position to a lower position. The tab 144 extends between the second ends 112 of the locking rings 102 of the first locking mechanism 100 and the second ends 132 of the locking rings 122 of the second locking mechanism 120, with a clearance therebetween when both the first and second locking mechanism 100 and 120 are located in their respective first positions as shown in FIG. 1.

The actuator member 140 may be manually slid in the longitudinal direction X to thereby engage and pivot the second ends 112 of the annular rings 102 about the first ends 110, while compressing the biasing member 94, to pivot the locking rings 102 to the second position wherein the locking rings 102 release their grip on the inner telescoping member 14 such that the inner telescoping member 14 is free to slide in the longitudinal direction Y downwardly into the outer telescoping member 16. However, the second locking mechanism 120, which remains in its first position, will continue to prevent sliding movement of the inner telescoping member 14 in the upward direction X.

The actuator member 140 may also be slid downwardly in the direction Y to engage and pivot the second ends 132 of the locking rings 122 of the second locking mechanism 120 about the first ends 130, while compressing the biasing member 82, to release the rim portions 134 and 136 from the inner telescoping member 14 and thereby allow the inner telescoping member 14 to slide in the longitudinal direction X out of the telescoping member 16. However, the first locking mechanism 100, which has remained in its first position, will continue to prevent sliding movement of the inner telescoping member in the downward direction Y. When the actuator member 140 is released, the biasing members 82 and 94 bias the locking rings 102 and 122 of the first locking mechanism 100 and the second locking mechanism 120 to their respective first positions wherein sliding longitudinal movement of the inner telescoping member 14 is not allowed in either longitudinal direction X or Y. When either the first locking mechanism 100 or the second locking mechanism 120 is located in the first position, rotational movement of the inner telescoping member 14 about the axis 32 relative to the outer telescoping member 16 is permitted.

Figure 4:
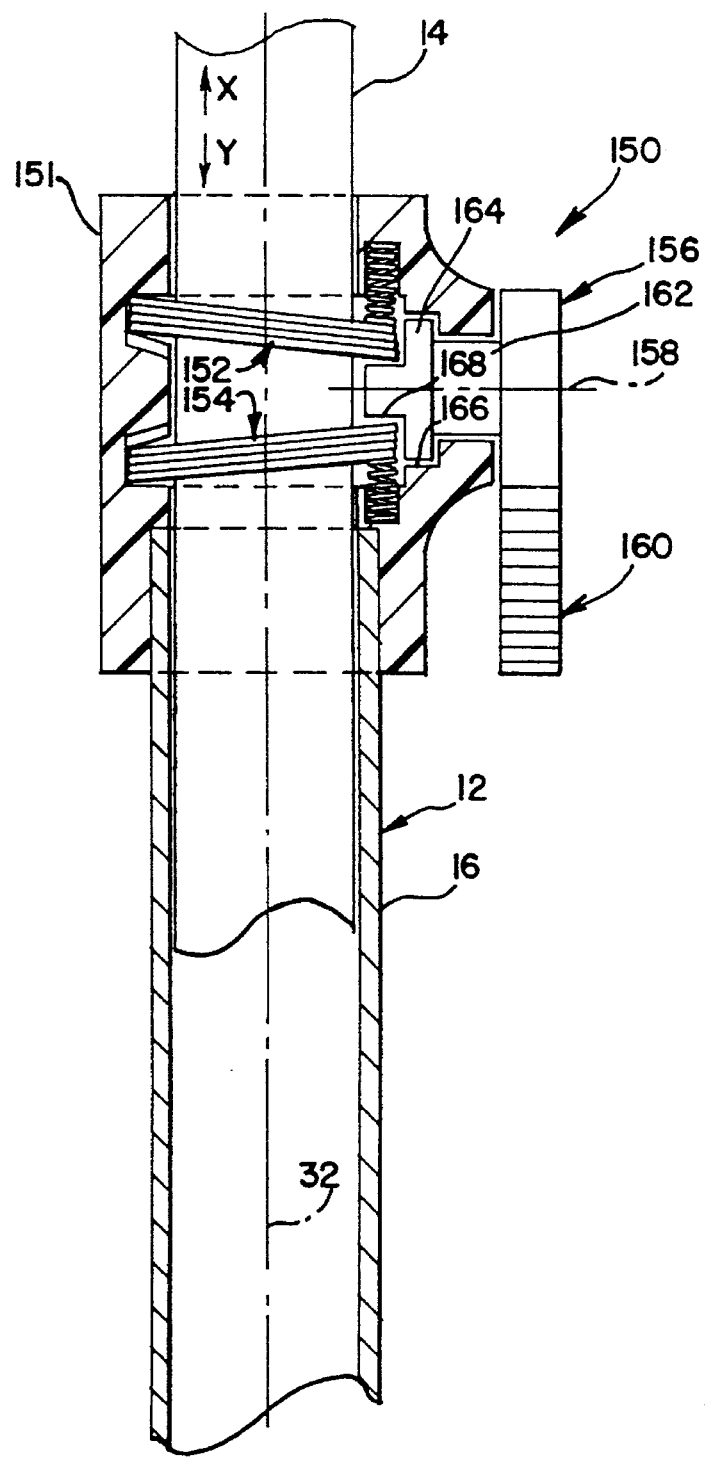
FIG. 4 shows a modified embodiment of the locking device of the present invention.
Figure 5:
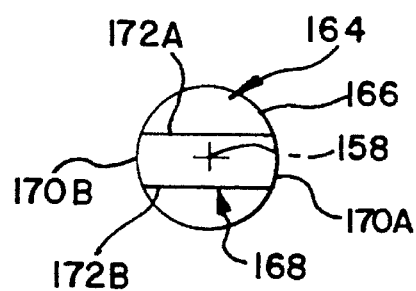
FIG. 5 is a partial side elevational view of the actuator member of the modified embodiment.

FIG. 4 shows a modified embodiment of the locking device of the present invention designated with the numeral 150. The locking device 150 includes a housing 151, a locking mechanism 152 and a locking mechanism 154 which are constructed and operate in the same manner as the locking mechanisms 100 and 120. The locking device 150 differs from the locking device 10 in the type of actuator member that is used. The locking device 150 includes an actuator member 156 which is selectively manually rotatable about an axis 158 which is generally perpendicular to the longitudinal axis 32 of the telescoping members 14 and 16. The actuator member 156 includes a lever arm member 160 attached at one end to a generally cylindrical shaft 162, and a camming member 164 attached to the shaft 162. The camming member 164 includes a generally cylindrical portion 166 attached to the shaft 162 and an engagement portion 168 as shown in FIG. 5. The engagement portion 168 includes spaced apart and opposing curved end walls 170A and 170B and spaced apart and opposing generally planar top and bottom walls 172A and 172B. The end walls 170A–B are spaced apart farther than the walls 172A–B.

The engagement portion 168 is located between the second ends of the locking mechanisms 152 and 154 such that when the actuator member 156 is located in a first position, the planar top and bottom walls 172A and B are generally perpendicular to the axis 32, and the locking mechanisms 152 and 154 are biased to their first positions wherein longitudinal movement of the inner telescoping member 14 with respect to the outer telescoping member 16 is prevented in both longitudinal directions X and Y. When the lever arm 160 is manually rotated in either a clockwise or counterclockwise direction about the axis 158, the engagement portion 168 of the camming member 164 will engage the first locking mechanism 152 at one end 170A or 170B of the engagement portion 16 and the other end the second locking mechanism 154. Further rotation of the lever arm 160 and camming member 164 will pivot the second end of the first locking mechanism 152 upwardly to the second position and will simultaneously pivot the second end of the second locking mechanism 154 downwardly to the second position, wherein the inner telescoping member 14 may be moved in either longitudinal direction X or Y as desired. When the lever arm 160 is rotated back to its first position, the locking mechanisms 152 and 154 will be biased to the first positions to prevent the inner telescoping member 14 from moving longitudinally in either the X or Y direction with respect to the outer telescoping member 16.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A locking device for selectively locking a first telescoping member to a second telescoping member to prevent longitudinal movement therebetween, while selectively allowing the first telescoping member to slide in a first longitudinal direction with respect to the second telescoping member and to selectively slide in a second and opposite longitudinal direction with respect to the second telescoping member, said locking device including:

a housing including a sidewall having a first end and a second end and a bore extending though said housing between said first end and a second end of said sidewall, said housing being connectable to the second telescoping member and the first telescoping member extending through said bore;

a first locking mechanism disposed within said housing, said first locking mechanism including a first engagement portion adapted to selectively engage the first telescoping member and a second engagement portion adapted to selectively engage the first telescoping member, said locking mechanism being pivotal between a first position and a second position, wherein said first locking mechanism, when in said first position, prevents longitudinal movement of the first telescoping member in the first longitudinal direction with respect to the second telescoping member, and when in said second position, said first locking mechanism permits movement of the first telescoping member in the first longitudinal direction with respect to the second telescoping member;

a second locking mechanism disposed within said housing, said second locking mechanism including a third engagement portion adapted to engage the first telescoping member and a fourth engagement portion adapted to engage the first telescoping member, said second locking mechanism being pivotal between a first position, wherein said second locking mechanism prevents movement of the first telescoping member in the second longitudinal direction with respect to the second telescoping member, and a second position wherein said second locking mechanism permits movement of the first telescoping member in the second longitudinal direction with respect to the second telescoping member;

means for biasing said first locking mechanism toward said first position; and an actuator member associated with said first and second locking mechanisms such that said actuator member may assume at least three positions, whereby when said actuator member is in said first position the first telescoping member is prevented from sliding longitudinally with respect to the second telescoping member in both the first and second longitudinal direction, whereby when said actuator member is moved to a second position said actuator member pivots said first locking mechanism to said second position wherein the first telescoping member is allowed to slide longitudinally with respect to the second telescoping member in the first longitudinal direction, and whereby when said actuator member is moved to the third position said actuator member pivots said second locking mechanism to said second position wherein the first telescoping member is allowed to slide longitudinally with respect to the second telescoping member in the second longitudinal direction.

2. The locking device of claim 1 including means for biasing said second locking mechanism toward said first position.

3. The locking device of claim 2 wherein each said biasing means respectively comprises a spring.

4. The locking device of claim 1 wherein said actuator member includes a tab associated with said first and second locking mechanisms for selectively pivoting said first locking mechanism from said first position to said second position while said second locking mechanism remains in said first position or for selectively pivoting said second locking mechanism from said first position to said second position while said first locking mechanism remains in said first position.

5. The locking device of claim 1 wherein said actuator member includes an engagement portion associated with said first and second locking mechanisms for selectively simultaneously pivoting both said first and second locking mechanisms from the first position to the second position when said actuator member is moved to said second position or said third position.

6. The locking device of claim 1 wherein said housing includes a first chamber adapted to receive a first end of said first locking mechanism.

7. The locking device of claim 6 where said housing includes a second chamber adapted to receive said biasing means.

8. The locking device of claim 1 wherein said actuator member includes a tab which selectively engages a second end of said first locking mechanism and a second end of said second locking mechanism.

9. The locking device of claim 1 wherein said first locking mechanism comprises at least one ring having an aperture through which the first telescoping member extends.

10. The locking device of claim 1 wherein said first and second locking mechanisms each comprise a plurality of rings, each ring having an aperture through which the first telescoping member extends.

11. The locking device of claim 1 wherein said first locking mechanism and said second locking mechanism each respectively include an aperture through which the first telescoping member extends.

12. A releasable locking device for a first telescoping pole and a second telescoping pole including:

a housing adapted to enclose a portion of the first pole and a potion of the second pole;

a bore extending through said housing adapted to receive a portion of the first pole and a portion of the second pole;

first and second locking rings disposed within said housing, each said locking ring defining a central aperture therethrough, each said aperture being sized such that the inner diameter of said aperture is greater than the outer diameter of the first pole to provide clearance therebetween;

a first mounting means associated with a first edge of said first locking ring, said first mounting means adapted to secure said first edge in place but to allow said first locking ring to pivot about said first mounting means;

a second edge of said first locking ring disposed substantially 180° around said first locking ring from said first edge;

a first resilient biasing means disposed within said housing associated with said second edge of said first locking ring, said first biasing means adapted to urge said first locking ring to pivot about said first mounting means in a clockwise direction;

a second mounting means associated with a first edge of said second locking ring, said second mounting means adapted to secure said first edge in place but to allow said second locking ring to pivot about said second mounting means;

a second edge of said second locking ring disposed substantially 180° around said second locking ring from said first edge;

a second resilient biasing means disposed within said housing and associated with said second edge of said second locking ring, said second biasing means adapted to urge said second locking ring to pivot about said second mounting means in a counter-clockwise direction;

a release member positioned between and selectively associated with said first and second locking rings such that said release member may assume at least three positions, whereby when said release member is in said first position the first pole is prevented from sliding longitudinally with respect to the second pole in both a first and second longitudinal direction, whereby when said release member is moved to a second position said release member pivots said first locking ring about said first mounting means wherein the first pole is allowed to slide longitudinally relative to the second pole in the first longitudinal direction, and whereby when said release member is moved to the third position said release member pivots said second locking ring about said second mounting means wherein the first pole is allowed to slide longitudinally with respect to the second pole in the second longitudinal direction.

13. The releasable locking device of claim 12 wherein said bore extending through said housing includes a first generally cylindrical wall portion having a first diameter and a second generally cylindrical wall portion having a second diameter, said second diameter being shorter than said first diameter.

14. The releasable locking device of claim 12 wherein said first and second mounting means respectively comprise a first chamber and a second chamber formed in said housing, said first edge of said first locking ring being located in said first chamber and said first edge of said second locking ring being located in said second chamber.

15. The releasable locking device of claim 12 wherein said first and second mounting means comprise a rib having an upper surface and a lower surface, said upper surface pivotally securing said first edge of said first locking ring to said housing, said lower surface pivotally securing said first edge of said second locking ring to said housing.

16. The releasable locking device of claim 12 including a third locking ring associated with said first locking ring, said third locking ring including a central aperture through which the first pole extends.

17. The releasable locking device of claim 16 including a fourth locking ring associated with said second locking ring, said fourth locking ring including a central aperture through which the first pole extends.

18. The releasable locking device of claim 16 wherein said first and third locking rings are moveable relative to one another.

19. The releasable locking device of claim 12 wherein said first and second biasing means each comprise a respective spring member.

* * * * *